United States Patent [19]
Lee

[11] Patent Number: 5,726,977
[45] Date of Patent: Mar. 10, 1998

[54] APPARATUS AND METHOD FOR DETERMINING A NETWORK NODE CONGESTION STATE IN ORDER TO CONTROL THE CONGESTION IN AN ATM NETWORK

[75] Inventor: Soong Hee Lee, Yuseong-Ku, Rep. of Korea

[73] Assignees: Korea Telecommunication Authority, Daejeon; Electronics and Telecommunications Research Institute, Seoul, both of Rep. of Korea

[21] Appl. No.: 577,392

[22] Filed: Dec. 22, 1995

[30] Foreign Application Priority Data

Dec. 22, 1994 [KR] Rep. of Korea ............... 1994-36105

[51] Int. Cl.$^6$ ............................................. H04L 12/26
[52] U.S. Cl. ............................................. 370/235; 370/238
[58] Field of Search ............................................. 370/229-238, 370/249

[56] References Cited

U.S. PATENT DOCUMENTS 5,042,029 8/1991 Hayakawa .
5,090,011 2/1992 Fukuta et al. .
5,519,689 5/1996 Kim ........................................ 370/238

FOREIGN PATENT DOCUMENTS 446 956 9/1991 European Pat. Off. .
WO93/20637 10/1993 WIPO .

Primary Examiner—Melvin Marcelo
Attorney, Agent, or Firm—Spencer & Frank

[57] ABSTRACT

As stated above, since the control, according to different types of service traffics, is executed by detecting the congestion state by output buffers, whose numbers is fixed, of the network node, the present invention can remove a load of hardware which may be caused by the variable number of virtual connections in case of executing the congestion by the virtual connections. Therefore, the present invention has the effect of simplification of circuitry implement. Also, the present invention can exclude out of the network node the possibility of the congestion which can be generated by the transmission delay, because the congestion state in the network node is determined concerning the transmission delay.

5 Claims, 5 Drawing Sheets

APPARATUS AND METHOD FOR DETERMINING A NETWORK NODE CONGESTION STATE IN ORDER TO CONTROL THE CONGESTION IN AN ATM NETWORK

FIELD OF THE INVENTION

The present invention relates to a method and an apparatus for determining congestion in a network node, and more particularly, to a method and an apparatus for determining the state of the congestion in an ATM (Asynchronous Transfer Mode; hereinafter, referred to as ATM) network node.

BACKGROUND OF THE INVENTION

Generally, a congestion control method can be classified into two methods, one of which is a preventive control method to control the associated traffic parameters in advance to observe the amount of traffic negotiated with users, such as a connection admission control (CAC) or an usage parameter control (UPC), and the other of which is a reactive control method not to have an evil influence on the adjacent network nodes and terminals under the congestion state, such as explicit congestion notification (ECN).

The following techniques have been used as a reactive control method.

"An ATM transmission system with a variable transmission rate" by Kasahara Hiroyuki (European Patent No. 0 446 956 A2) provides a manner which measures the frequency in the cell negation generated in the receiving side, and transfers the value of the determined transmitting speed to the receiving side and transfers the cell to the transmitting side with the speed. This manner illustrates a scheme which transfers the control signals from the receiving side to the transmitting side. Although this manner illustrates the control method only after the cell discard is generated in the receiving side, it doesn't show a scheme to prevent the cell discard from being in the receiving side.

"Packet congestion control method and packet switching equipment" by Isao Fukuta (U.S. Pat. No. 5,090,011) illustrates a signal generating method and a signal transferring procedure between a packet node and a packet terminal for a congestion control informing of a congestion state by appending a congestion indicator, which perceives a congestion state in a switch unit in a packet switch and informs the result, to the packet for a source. However, this procedure of the control is complex.

"Congestion control method and apparatus for end-to-end packet communication" by Fuimiyasu Wayakawa (U.S. Pat. No. 5,042,029) illustrates a congestion sensor to sense the traffic congestion in the system in a packet exchange network of the configuration which sends an acknowledgement packet to notify that each destination data terminal receives an exact packet from a source terminal. In this method, if the congestion is sensed, the acknowledgement packet from the destination data terminal is immediately stored in a buffer during a predetermined time, and the acknowledgement packet is sent to the source to prevent the congestion from being generated after the elapse of the predetermined time. However, since this method keeps the transmission of the acknowledgement packet in the packet network under control, it is difficult to use in a data transmission not needing an acknowledgement such as ATM.

"Congestion control for cell network" by L. A. Bustini (WO 93/20637) illustrates a feedback control system to prevent congestion from being generated in the communication network based on a cell. Since the bursty traffic is not comparatively sensitive to the delay, a cell loss may be reduced by providing appropriate capacity of the buffer. Each neutral node monitors the length of a buffer queue and generates the control signal indicating the congestion. When a queue state is transmitted to a target node, the target node generates a feedback control signal in a 2-bit code and sends it to a source node. The source node reduces the cell loss in the target node, making the bursty data transmission uniform according to the feedback control signal. However, this patent provides a method for preventing the congestion from being generated in NNI (Network Node Interface) by signal transmission between nodes forming the network. Also, this patent doesn't refer to the user-network interface (UNI) device where there is quite a possibility of congestion because of the concentration of traffic.

The paper by Wassim Matragi, "Combined Reactive/ Preventive Approach for Congestion Control in ATM Networks," Proc. ICC' 93, pp 1336–1342, illustrates a method for controlling the congestion in networks by controlling the speed of cell transmission using the leaky bucket method.

All of the above-mentioned methods control congestion in a network by controlling the cell transmission speed. However, in cases where the cell transmission must be constrained when congestion is generated in the destination side, the above-mentioned methods have problems in that the cell transmission is not interrupted when the congestion is generated from the source side, because the cell transmission is generated continuously even if its amount is small. Also, since the effects of a transmission delay are not taken into consideration in the link between the destination side and the source side, significant information at the user side is not protected if the transmission delay time, which is demanded in the transmission of the congestion acknowledgement signal, is long. Accordingly, such as the Back Pressure method disclosed in the paper, "Traffic Control for Best Effort Data Communication in ATM Network: Simulation Comparison of Alternative Schemes", Proc. IFIP'94 by G. Bagnoli, etc., it may be effective to perceive the congestion state concerning the transmission delay on the transmission link, and to perfectly interrupt the cell transmission in the source side when there is a possibility of congestion.

In the above-mentioned paper, the control method is applied to only the best effort service in an ATM network, and intends to prevent an excess in the source side from being generated by simultaneously keeping watch over the buffer level. However, in practice, since the cell losses in the network node (destination side) have a more significant effect on the congestion state in the network side than the cell losses in the source side, the cell transmission by keeping watch over the buffer level may aggravate the congestion state. Also, a definite implement scheme beyond the basic method is not disclosed. Furthermore, all the above-mentioned methods have not disclosed a concrete implementation to perform appropriate congestion control according to different types of service traffics.

SUMMARY OF THE INVENTION

An object of the present invention is to provide a method and an apparatus for effectively controlling congestion which is generated by fluctuation of traffics.

In accordance with an aspect of the present invention, there is provided an apparatus comprising: a network node control means which includes: a) a network node maintenance/management routine for transmitting a loop-back cell transmission signal in order to measure a maximum delay value between a network node and user-network interface devices being connected with it, and for receiving said loop-back cell transmission signal which is turned back and transmitting a loop-back cell arrival signal; b) a connection management routine for renewing allocation bandwidth values by output buffers using header information of received cells and renewing all said allocation bandwidth values; and c) a quasi-congestion threshold value calculation routine for calculating, by output buffers, a quasi-congestion threshold value using allocation bandwidth values from said connection management routine, a maximum delay and a buffer maximum size value, according to an interrupt desire signal generated by said loop-back cell arrival signal; a timing means for counting the time said loop-back cell transmission signal is turned back as said loop-back cell arrival signal; a quasi-congestion threshold value determination control means for reading the counted value by said timing means, and outputting said maximum delay value and said interrupt desire signal to said a quasi-congestion threshold value calculation routine; a congestion state discrimination means for receiving a quasi-congestion threshold value and said buffer maximum size value, which are calculated by said quasi-congestion threshold value calculation routine, buffer read signals and buffer write signals inputted from a output buffer of said network node, and for discriminating a congestion state in said network node; and a memory means for storing a value of said congestion state outputted by said congestion state discrimination means.

In accordance with another aspect of the present invention, there is provided a method comprising the steps of: constructing a test loop which measures the maximum delay between said network node and user-network interface devices being in connection therewith if a bandwidth value of virtual connections, which are allocated in each output buffer, is determined; transmitting loop-back cells to all said user-network interface devices if it is notified that said test loop has been constructed, and simultaneously clearing a timing means to measures the maximum delay; counting the cells by said timer until the transmitted all loop-back cell signals come back, and if all cells come back, stopping said timer's count; writing the count value of said timer to a maximum delay register, and generating said an interrupt signal to network node controller and calculating a quasi-congestion threshold value, and writing said quasi-congestion threshold value to a register; and estimating a congestion state using said quasi-congestion threshold value stored in said register.

BRIEF DESCRIPTION OF THE DRAWINGS

The above and other aspects and advantages of the present invention are described in conjunction with the following drawing figures, in which.

DETAILED DESCRIPTION OF THE INVENTION

Hereinafter, an embodiment of the present invention will be described below.

Figure 1:
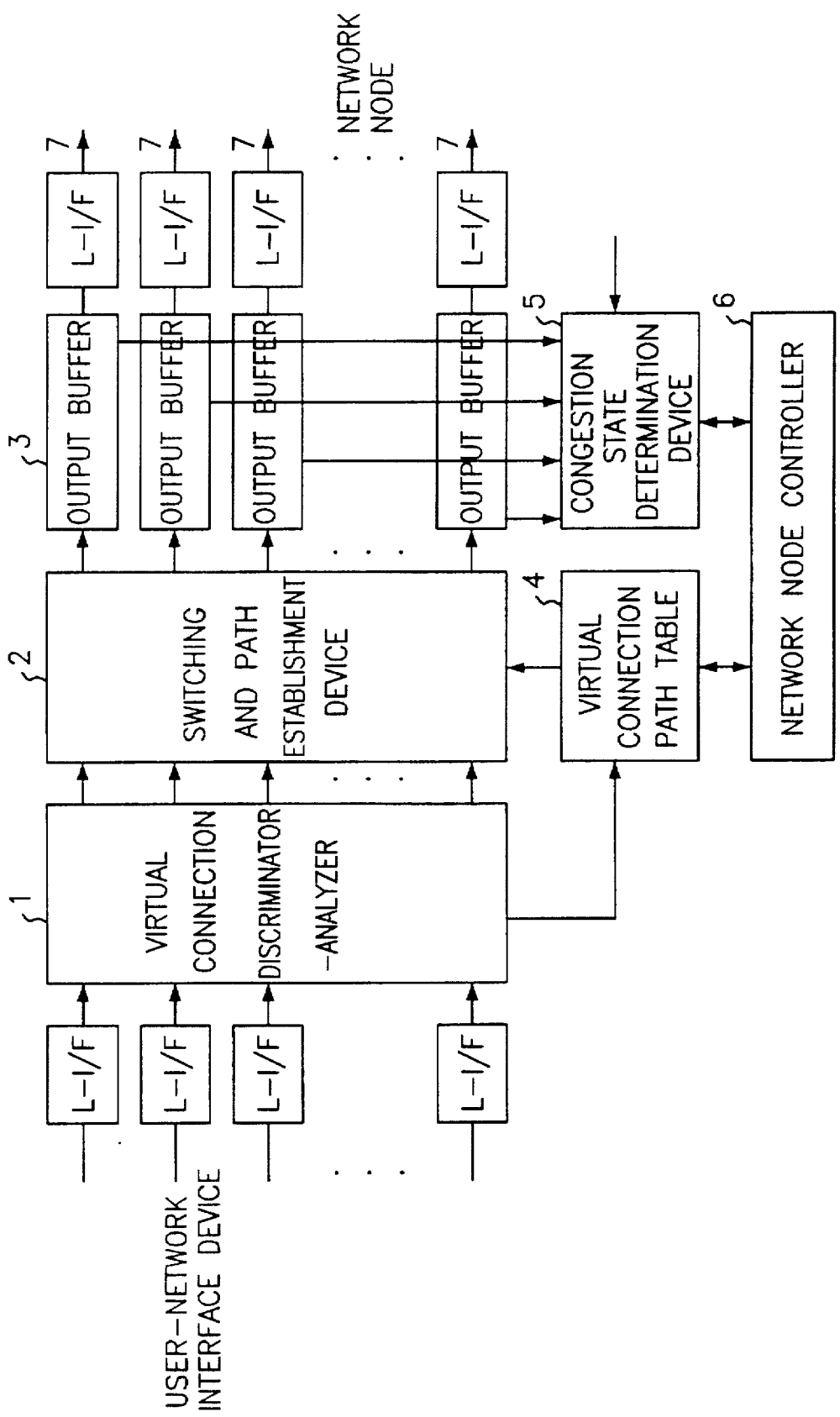
FIG. 1 is a block diagram of an ATM network node in accordance with the present invention.

FIG. 1 is a block diagram of an ATM network node in accordance with the present invention, the numeral 1 denotes a virtual connection discriminator-analyzer, 2 a switching and path establishment device, 3 an output buffer, 4 a virtual connection path table, 5 a congestion state determination device, 6 a network node controller, and 7 network nodes.

Cells, which are inputted through the network nodes 7, are applied to the virtual connection discriminator-analyzer 1 through line-interfaces. The virtual connection discriminator-analyzer 1 analyzes a virtual connection discriminator in the header of input cells and transmits the result to the virtual connection path table 4. The virtual connection path table 4 controls the switching and path establishment device 2, by applying path information by virtual connections in the virtual connection path table 4 to control the switch and the path establishment device 2 according to the result from the virtual connection discriminator-analyzer 1, so that input cells from the virtual connection discriminator-analyzer 1 are sent to the output buffer 3. At this time, to prevent cell losses due to excessive traffic concentration, the output buffer 3 includes a storage means. However, as stated above, when traffic beyond the capacity of the storage means in the output buffer 3 is inputted into the output buffer 3, congestion is generated due to cell losses. Therefore, to take precaution against the congestion, the congestion state determination device 5, which is capable of determining the congestion state through the observation of the buffer level, is needed.

The network node controller 6 performs the observation, the control and the management, etc., of the entire network node, and receives congestion state information from the congestion state determination device 5, and transmits it to user-network interface devices, and supports the performance of an observation function of the congestion state.

Figure 2:
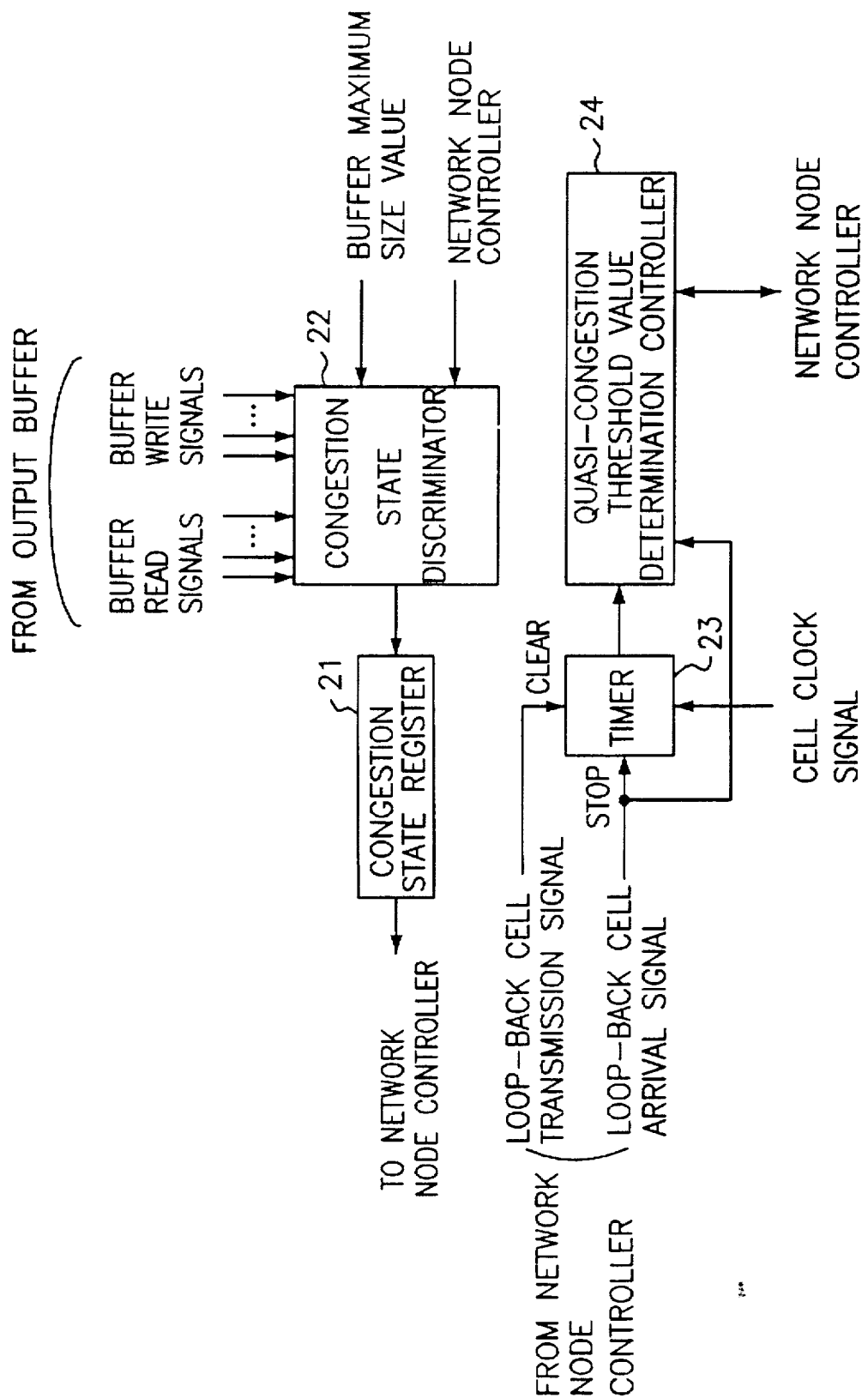
FIG. 2 is a block diagram of apparatus for determining an ATM network node congestion state in accordance with the present invention.

FIG. 2 shows a detailed configuration of the congestion state determination device 5 in FIG. 1.

A timer 23 to detect the transmission delay time between the network node and user-network interface devices is cleared by a loop-back cell transmission signal transmitted from the network node controller 6 in FIG. 1, increases the counter one by one every time each clear signal is activated, and stops counting if a loop-back cell arrival signal is transmitted thereto. A quasi-congestion threshold value determination controller 24 reads the count of the timer 23.

The quasi-congestion threshold value determination controller 24 outputs a control signal to determine a quasi-congestion threshold value necessary to discriminate the network node congestion state, reading the count of the timer 23. Also, the quasi-congestion threshold value calculator in the network node controller 6 calculates and outputs a quasi-congestion threshold vale. A congestion state discriminator 22 discriminates the congestion of the network node through a buffer read signal and a buffer write signal from the output buffer 3 in FIG. 1, the quasi-congestion threshold value determined by the quasi-congestion threshold value calculator, and a buffer maximum size value from the network node controller. The detailed illustration, with respect to the quasi-congestion threshold value determination controller 24, will be described referring to FIGS. 3 and 4. In succession, a congestion state register 21 temporarily stores a congestion state value from the congestion state discriminator 22, and outputs it into the network node controller in FIG. 1.

Figure 3:
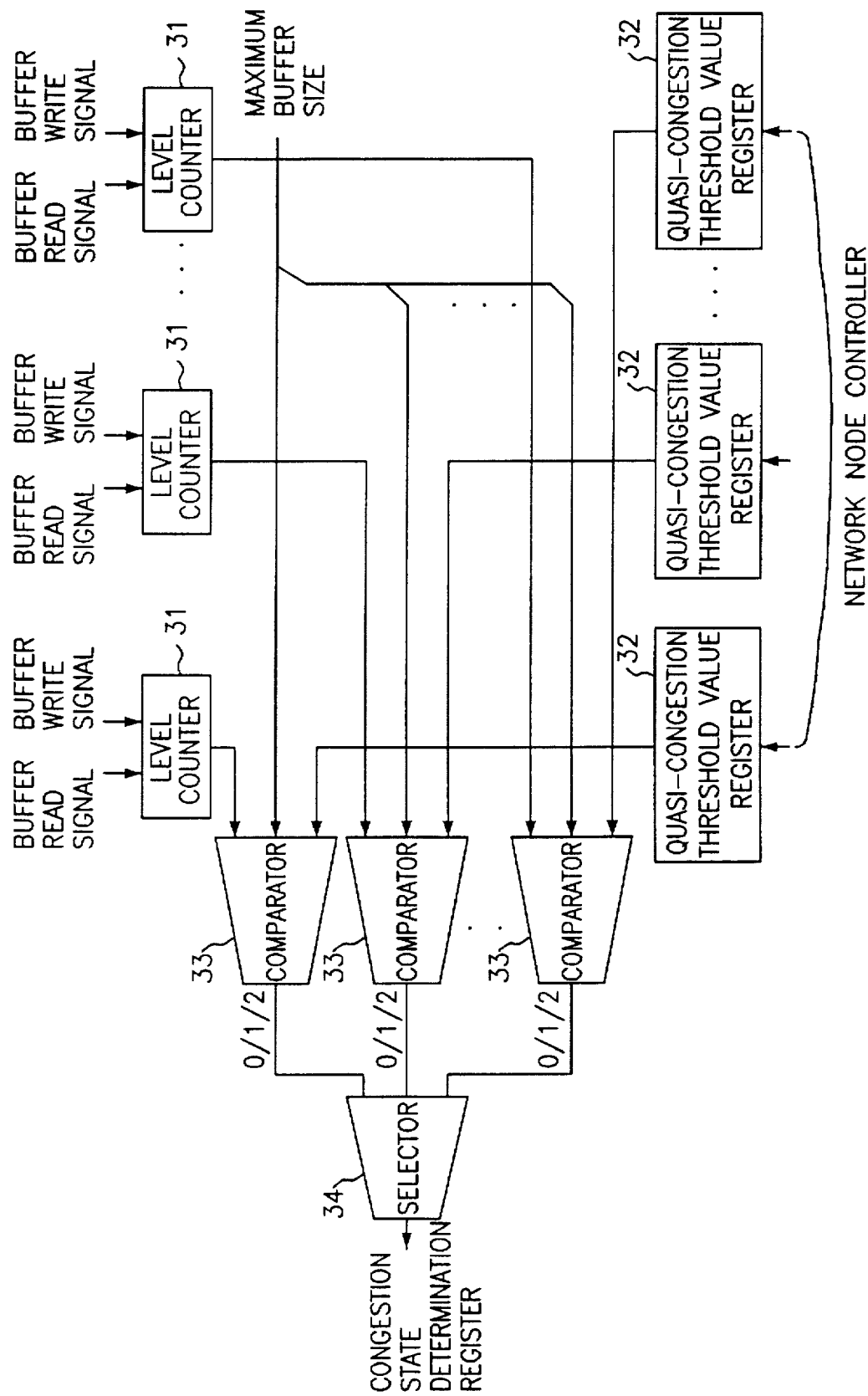
FIG. 3 is a detailed block diagram of a congestion state discriminator employed in FIG. 2.

Referring now to FIG. 3, in which the detailed configuration of the congestion state discriminator 22 is shown, a output buffer level counter 31 receives the buffer read signal and the buffer write signal from the output buffer 3 in FIG. 1, and perceives the buffer level of the output buffer 3. The quasi-congestion threshold value register 32 stores the quasi-congestion threshold value determined by the quasi-congestion threshold value calculator. On the other hand, a comparator 33 compares each output buffer level transmitted from the output buffer level counter 31 with the corresponding quasi-congestion threshold value which the quasi-congestion threshold value register 32 stores. If the output buffer level is lower than the quasi-congestion threshold value, the comparator 33 outputs "0" indicating a normal state, and if it is the same or higher, it compares output buffer level with the buffer maximum size value from the network node controller. If the output buffer level is lower than the buffer maximum size value, the comparator 33 outputs "1" indicating a quasi-congestion state, and if it is the same or higher, it outputs "2" indicating a congestion state. A maximum value selector 34 selects the maximum value of inputs from the comparator 33, and writes it as the congestion state of the network node to the congestion state register 21 in FIG. 2.

Figure 4:
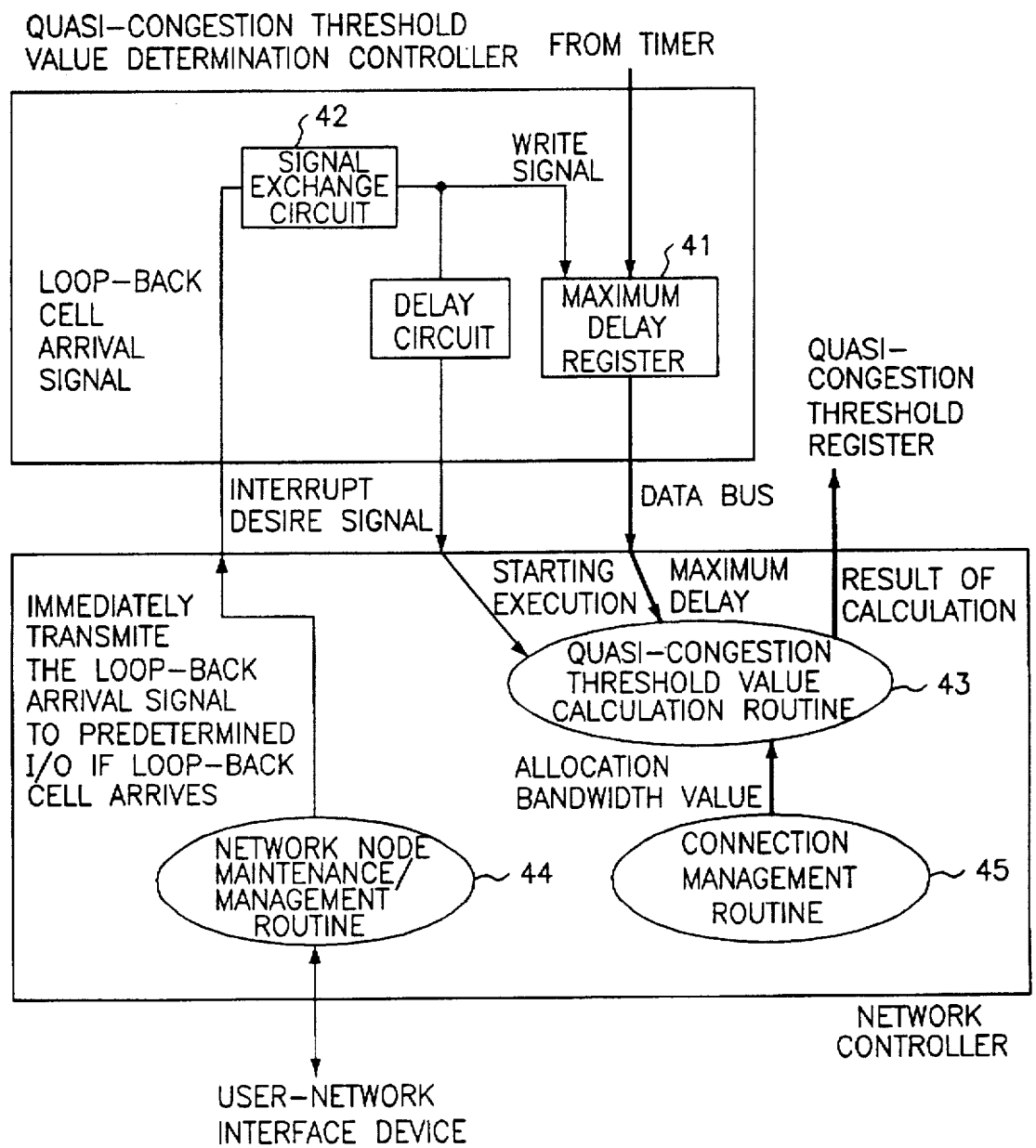
FIG. 4 is a detailed block diagram illustrating operation of the quasi-congestion threshold value determination controller and the network node controller of FIG. 2.

FIG. 4 illustrates the operation of the quasi-congestion threshold value determination controller 24 and the network node controller in FIG. 2. In FIG. 4, the numerals 43 through 45 are software routines stored in the network node controller 6. A maximum delay register 41 stores a maximum delay value from the timer 23 in FIG. 2. A signal exchange circuit 42 generates an interrupt desire signal to stir execution of a write signal and a quasi-congestion threshold value calculation routine 43, which the maximum delay register 41 requires, using the loop-back cell arrival signal generated by the operation of a network node maintenance/management routine 44 in the network node controller 6.

When the interrupt desire signal is generated, the quasi-congestion threshold value calculation routine 43 is driven, and then, outputs the quasi-congestion threshold values of each output buffers to the quasi-congestion threshold value registers 32 in FIG. 3, by executing the following equation using a maximum delay transmitted from the maximum delay register 41 and allocation bandwidth values of the output buffer transmitted from the connection management routine 45.

$$A=B-C*D$$

Where A is the quasi-congestion threshold value, B is the buffer maximum size, C is the allocation bandwidth value of the output buffer, and D is the maximum delay.

The connection management routine 45 relocates, by connections, each allocation bandwidth value, which is the result of a connection admission control, using header information, and provides the allocation bandwidth in a unit cell by output buffers with the quasi-congestion threshold value calculation routine 43.

In case where the output buffer in FIG. 1 has a constant size, the practical capacity of the each output buffer is set up to the buffer maximum size value in the quasi-congestion threshold value calculation routine 43. Also, in case where the construction of a shared output buffer is used, a current size, which is allocated, is set up to the buffer maximum size value.

Although, in the present invention, the quasi-congestion threshold value calculation routine 43 is implemented by the software routine stored in the network node controller 6 in FIG. 1, it can be replaced with hardware circuits having multiplication and subtraction means in order to reduce the processing time.

Figure 5:
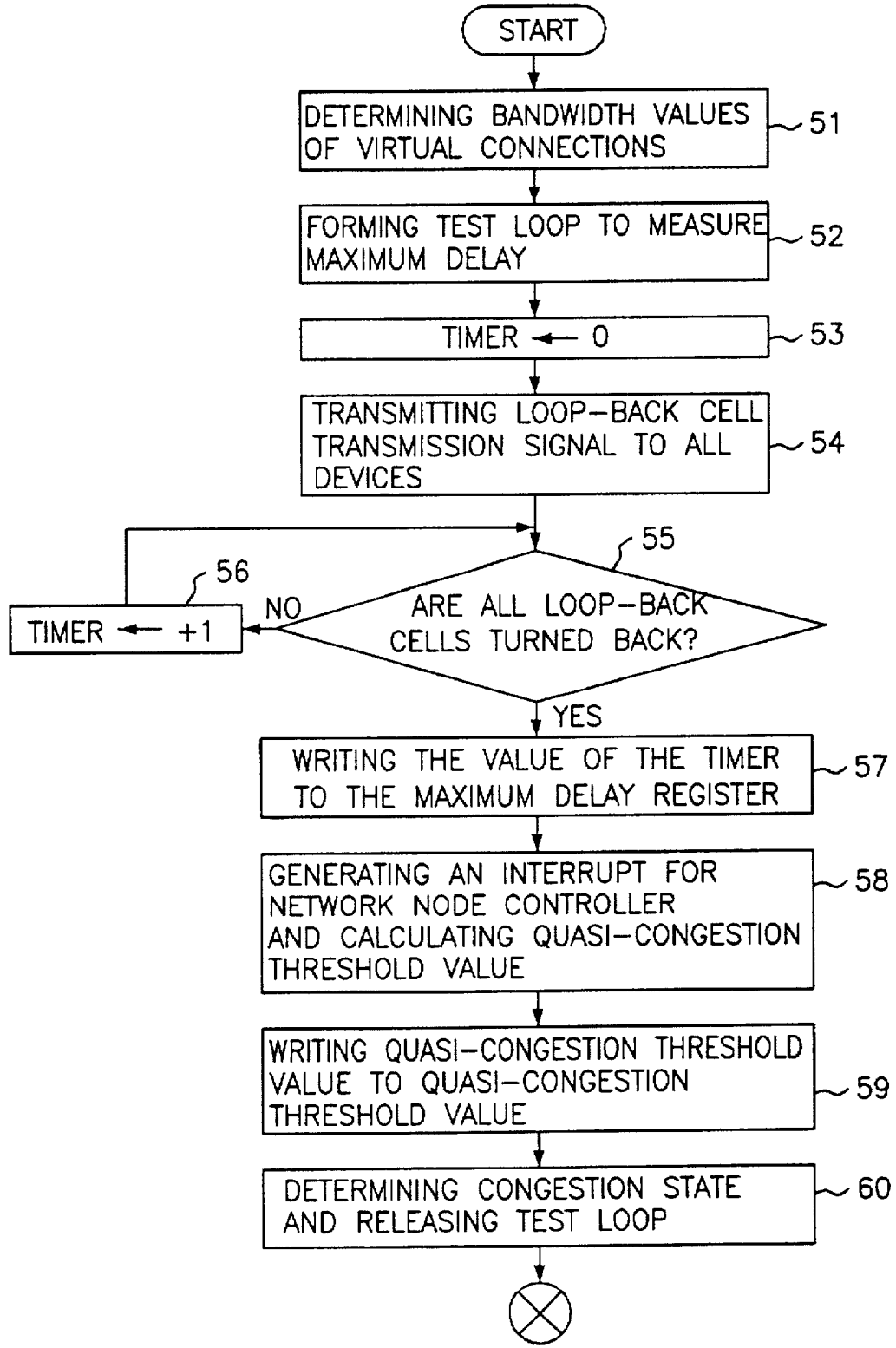
FIG. 5 is a flow chart illustrating a network node congestion state in accordance with the present invention.

Referring now to FIG. 5, a method for controlling a network node congestion state in accordance with the present invention will be described.

At step 51, provided the connection management routine determines the bandwidth value of the virtual connections which are allocated in each output buffer, the maintenance/management routine orders the user-network interface devices to construct a test loop to measure the maximum delay between the network node and the user-network interface devices Which be in connection therewith at step 52. At steps 53 and 54, if the maintenance/management routine is notified from the user-network interface devices that the test loop is constructed, the maintenance/management routine simultaneously transmits loop-back cell signals to all the user-network interface devices, clears the timer to measure the maximum delay, and starts the count from 0.

At steps 55 and 56, the maintenance/management routine has the timer count the cells until all the transmitted loop-back cells come back, has the timer stop counting the cells, at step 57, if all the cells come back, and writes the result of the count to the maximum delay register through the signal exchange circuit 42. At step 58, the maintenance/management routine generates an interrupt for the network node controller through the signal exchange circuit, drives the quasi-congestion threshold value calculation routine, and, at step 59, writes the result to the quasi-congestion threshold value register. Accordingly, at step 60, the congestion state discriminator determines the congestion state in the network node using the quasi-congestion threshold value stored in the quasi-congestion threshold value register.

As stated above, since the control, according to different types of service traffics, is executed by detecting the congestion state by output buffers, whose numbers is fixed, of the network node, the present invention can remove a load of hardware which may be caused by the variable number of virtual connections in case of executing the congestion by the virtual connections. Therefore, the present invention has the effect of simplification of circuitry implement. Also, the present invention can exclude out of the network node the possibility of the congestion which can be generated by the transmission delay, because the congestion state in the network node is determined concerning the transmission delay.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for determining congestion in an ATM (Asynchronous Transfer Mode) network node having a network control means and output buffers, comprising:

a network node control means including:

a) a network node maintenance/management routine for transmitting a loop-back cell transmission signal in order to measure a maximum delay value between a network node and user-network interface devices being connected with it, and for receiving said loop-back cell transmission signal which is turned back and transmitting a loop-back cell arrival signal;

b) a connection management routine for renewing allocation bandwidth values by output buffers using header information of received cells and renewing all said allocation bandwidth values; and c) a quasi-congestion threshold value calculation routine for calculating, by output buffers, a quasi-congestion threshold value using allocation bandwidth values from said connection management routine, a maximum delay and a buffer maximum size value, according to an interrupt desire signal generated by said loop-back cell arrival signal;

a timing means for counting the time said loop-back cell transmission signal is turned back as said loop-back cell arrival signal;

a quasi-congestion threshold value determination control means for reading the counted value by said timing means, and outputting said maximum delay value and said interrupt desire signal to said a quasi-congestion threshold value calculation routine;

a congestion state discrimination means for receiving a quasi-congestion threshold value and said buffer maximum size value, which are calculated by said quasi-congestion threshold value calculation routine, buffer read signals and buffer write signals inputted from a output buffer of said network node, and for discriminating a congestion state in said network node; and a memory means for storing a value of said congestion state outputted by said congestion state discrimination means.

2. An apparatus in accordance with claim 1, wherein said congestion state discrimination means comprises:

a first means for perceiving a buffer level of said output buffer, and receiving said buffer read and write signals from said output buffer;

a plurality of second means for storing said quasi-congestion threshold value determined by said quasi-congestion threshold value determination control means;

a plurality of third means for comparing said buffer level from said first means with said quasi-congestion threshold value stored in said second means or the buffer maximum value, and for generating a signal indicating the state of said network node; and a fifth means for selecting the maximum value of inputs from said third means and generating a congestion state value indicating the state of said network node.

3. An apparatus in accordance with claim 2, wherein said third means generates a first state signal indicating that the network node is the normal state if each said buffer level from said first means is lower than said quasi-congestion threshold value stored in said second means, and, if it is the same or larger, compares each said buffer level from said first means with the buffer maximum size, and then, generates a second state signal indicating that the network node is the quasi-congestion state if each said buffer level from said first means is lower than the buffer maximum size, and generates a third state signal indicating that the network node is the congestion state if each said buffer level from said first means is the same as or larger than the buffer maximum size.

4. A method for determining congestion in an ATM (Asynchronous Transfer Mode) network node having a network control means and output buffers, said method comprising the steps of:

constructing a test loop which measures the maximum delay between said network node and user-network interface devices being in connection therewith if a bandwidth value of virtual connections, which are allocated in each output buffer, is determined;

transmitting loop-back cells to all said user-network interface devices if it is notified that said test loop has been constructed, and simultaneously clearing a timing means to measures the maximum delay;

counting the cells by said timer until the transmitted all loop-back cells come back, and if all cells come back, stopping said timer's count;

writing the count value of said timer to a maximum delay register, and generating said an interrupt signal to network node controller and calculating a quasi-congestion threshold value, and writing said quasi-congestion threshold value to a register; and estimating a congestion state using said quasi-congestion threshold value stored in said register.

5. A method in accordance with claim 4, where the quasi-congestion threshold value A is:

$$A = B - C*D$$

Where B is the buffer maximum size, C is the allocation bandwidth value of the output buffer, and D is the maximum delay.

* * * * *